(12) United States Patent
Le Bec et al.

(10) Patent No.: US 7,825,056 B2
(45) Date of Patent: Nov. 2, 2010

(54) ADSORBENT ZEOLITIC COMPOSITION, ITS METHOD OF PREPARATION AND ITS USE FOR REMOVING $H_2O$ AND/OR $CO_2$ AND/OR $H_2S$ CONTAINED IN GAS OR LIQUID MIXTURES

(75) Inventors: Rémi Le Bec, Labastide Cezeracq (FR); Nicolas Serge, Lons (FR)

(73) Assignee: Ceca, S.A., Puteaux (FR)

( * ) Notice: Subject to any disclaimer, the term of this patent is extended or adjusted under 35 U.S.C. 154(b) by 389 days.

(21) Appl. No.: 10/594,967

(22) PCT Filed: Mar. 30, 2005

(86) PCT No.: PCT/FR2005/000780

§ 371 (c)(1), (2), (4) Date: Sep. 29, 2006

(87) PCT Pub. No.: WO2005/094985

PCT Pub. Date: Oct. 13, 2005

(65) Prior Publication Data

US 2007/0214959 A1      Sep. 20, 2007

(30) Foreign Application Priority Data

Mar. 31, 2004    (FR) .................................. 04 03371

(51) Int. Cl.
| | |
|---|---|
| *B01J 29/06* | (2006.01) |
| *B01D 53/52* | (2006.01) |
| *B01D 15/00* | (2006.01) |

(52) U.S. Cl. .............................. 502/60; 502/63; 502/64; 502/67; 502/69; 502/400; 502/407; 502/414; 502/526; 210/767; 95/117; 423/220; 423/242.1; 423/248

(58) Field of Classification Search .................. 502/60, 502/63, 64, 67, 69, 400, 407, 414, 526; 95/117; 423/220, 242.1, 248; 210/767
See application file for complete search history.

(56) References Cited

U.S. PATENT DOCUMENTS

| | | | |
|---|---|---|---|
| 3,411,888 A | | 11/1968 | Drost et al. |
| 4,329,160 A | | 5/1982 | Sherman |
| 4,925,460 A | * | 5/1990 | Coe et al. ....................... 95/96 |
| 4,935,580 A | * | 6/1990 | Chao et al. .................... 95/139 |
| 4,964,889 A | * | 10/1990 | Chao .............................. 95/96 |
| 5,164,076 A | | 11/1992 | Zarchy et al. |
| 5,587,003 A | * | 12/1996 | Bulow et al. .................. 95/123 |
| 5,938,819 A | * | 8/1999 | Seery ........................... 95/104 |
| 6,284,021 B1 | * | 9/2001 | Lu et al. ........................ 95/96 |
| 6,638,340 B1 | * | 10/2003 | Kanazirev et al. .............. 95/96 |
| 7,300,899 B2 | * | 11/2007 | Weston et al. ................. 502/64 |
| 2002/0014457 A1 | | 2/2002 | Smith et al. |

FOREIGN PATENT DOCUMENTS

| | | |
|---|---|---|
| CN | 1179461 A | 4/1998 |
| WO | 97/10314 A | 3/1997 |
| WO | 03/053546 A | 7/2003 |

OTHER PUBLICATIONS

M.W. Ackley, et al.; Application of Natural Zeolites in the Purification and Separation of Gases; Microporous and Mesoporous Materials; Jul. 18, 2003; p. 25-42; vol. No. 61., Issue No. 1-3; Elsevier Science Publishing; New York City, U.S.

Database WPI; Section Ch, Week 200223; Derwent Publications Ltd.; London, GB; Class H04; An 2002-172318; XP002297141.

* cited by examiner

*Primary Examiner*—Elizabeth D Wood
(74) *Attorney, Agent, or Firm*—Millen, White, Zelano & Branigan, P.C.

(57) ABSTRACT

The present invention relates to zeolitic compositions of at least one A, X, Y zeolite and/or chabazite and at least one clinoptilolite type of zeolite.

These zeolitic compositions can be used in adsorption methods for removing $H_2O$ and/or $CO_2$ and/or $H_2S$ present in gas or liquid mixtures, particularly for purifying natural gas, acid gases, alcohols and mercaptans.

22 Claims, No Drawings

ADSORBENT ZEOLITIC COMPOSITION, ITS METHOD OF PREPARATION AND ITS USE FOR REMOVING H₂O AND/OR CO₂ AND/OR H₂S CONTAINED IN GAS OR LIQUID MIXTURES

TECHNICAL FIELD

The invention relates to zeolitic compositions usable in particular for adsorbing water and, optionally, $H_2S$ and/or $CO_2$ present in gas or liquid mixtures.

PRIOR ART

The use of zeolites, also called molecular sieves, is a common practice in gas purification methods, particularly for selectively removing molecules such as water or $H_2S$. These molecules are thereby adsorbed on these porous solids. The latter are then regenerated by a desorption step generally carried out by passing a hot gas on these solids. During these various steps, side reactions may occur, and this applies in particular to the following reaction when the gas (for example natural gas) contains both $H_2S$ and $CO_2$:

$$H_2S + CO_2 \rightarrow COS + H_2O$$

Although this reaction is fairly slow, it can be promoted by thermodynamic shift, the water being adsorbed by the zeolite, and by a catalytic effect.

According to P. H. Turnock et al., *Proceedings of the Gas Conditioning Conference* (1972), 22, B, the rate of formation of COS depends on the type of molecular sieve, particularly on its crystal structure, its composition, the raw materials and binder used, and its method of preparation. Several examples are provided, but without revealing the nature of these zeolites: some zeolites adsorb $H_2S$ well, but form a large amount of COS, while others form little COS but adsorb very little $H_2S$.

Cines et al., *C.E.P.* (August 1976), p 89, shows that under identical conditions, a 13X (or NaX) zeolite forms more COS than a 4A (or NaA) zeolite, which itself forms more than a 5A (or CaA) zeolite. This is corroborated by Lutz W et al., *Gas Separation & Purification* (1990), Vol 4, p 190 and in *Separation Technology*, edited by E. F. Vansant (1994), p 143, who show that this reaction is promoted by zeolites exchanged with sodium cation. Fellmuth et al., *Zeolites* (1987), Vol 7, p 367 states that this is particularly true when the sodium cation content is higher than 60% for X zeolite and higher than 40% for A zeolite.

Trent R. E. et al., *Proceedings Laurence Reid Gas Conditioning Conference* (1993), 43rd, 239-60, teaches that a 3A (KA) zeolite forms less COS than a 4A (NaA) zeolite.

Although less corrosive and toxic than $H_2S$, COS is undesirable in merchant natural gas, because, in the presence of traces of moisture, it may re-form corrosive $H_2S$. Moreover, in natural gas processing units, when recovering hydrocarbon cuts by liquefaction, COS is found in the propane cut due to its similar boiling point. For example, a gas containing 2% propane must have less than 0.1 ppmv COS in order to have less than 5 ppmv in the liquefied propane. It is therefore necessary to limit the formation of COS during gas processing on zeolite, in order to avoid the need subsequently to reprocess the liquefied propane.

In certain processes, a zeolite is used to remove both the water and $H_2S$ present in the gas. A 5A type of molecular sieve is then preferably used, agglomerated with a clay-type binder, thereby promoting the COS formation reaction as little as possible, but its formation is difficult to avoid completely. EP 783.362 in the name of the applicant describes such a technical solution.

Furthermore, units exist in which the gas containing $H_2S$ and $CO_2$ is only dehydrated and not desulfurized: this is the case, for example, of reservoirs in which the liquid fraction of the hydrocarbons is produced and not its gaseous fraction. In this case, acid gas is reinjected into the reservoir to enhance oil production by maintaining the pressure in the natural reservoir. In order to reinject the acid gas, however, it must be dehydrated to protect the compressors of the unit against corrosion and/or to transport the gas by pipeline without the risk of forming gas hydrates. In general, no other gases are available on site and dehydrated acid gas is therefore also used to regenerate the adsorbents. In this particular case, the adsorbent is intensively used because of the acidic, hot (>250° C.) and humid atmosphere, conditions favorable both to hydrothermal degradation (loss of the zeolite crystal structure) and to attack of the clay binders (mechanical deterioration). On the conventional synthetic zeolites listed above, these two mechanisms cause a rapid decrease in the adsorption capacity and higher pressure drops, demanding frequent replacement of the feeds.

Some natural zeolites are known for withstanding these conditions better. In the book "*Natural zeolites*, Ed. L. B. Sand & F. A. Mumpton, 1976", p 327, R. A. Sheppard stated that mordenite or chabazite can be used to remove $H_2S$, $CO_2$ or water from an acid gas, particularly the Bowie chabazite sold by UCC under the name AW 500. M. W. Ackley et al. (*PRAXAIR*), *Microporous and mesoporous Materials*, 61, p 25 (2003) states on p 32 that AW 500 is a chabazite agglomerated with a binder.

To remove traces of water and $CO_2$ present in natural gas, U.S. Pat. No. 4,935,580 uses clinoptilolite. U.S. Pat. No. 5,164,076 teaches that the removal of $H_2S$ present in a gas, at temperatures between 150 and 220° C., is more effective with clinoptilolite than with 4A zeolite, the Ba or K exchanged forms of clinoptilolite being preferred because the Na and Ca forms adsorb virtually no $H_2S$. This is corroborated by A. Sirkecioglu et al., *Sep. Sci. Technol.* 30 (13), p 2747-2762 (1995) which states that all the cationic forms of clinoptilolite adsorb $SO_2$ whereas $H_2S$ is equally well adsorbed on the K and H forms, but very little on the Na and Ca forms.

In industrial practice, it is found that clinoptilolite is little used for drying gas because it has much lower adsorption capacities than other zeolites, such as chabazite, for example.

Other applications exist requiring the drying of acid gases, of the pure $H_2S$ type or $H_2S$—$CO_2$ mixtures, when the latter are used as reaction gases, for example for the synthesis of mercaptans. For the synthesis of products using such acid gases (for example synthesis of mercaptans) to yield the purest possible products, it is also preferable for the formation of byproducts such as COS to be minimized during the drying of these gases on a zeolite. Such a zeolite must also withstand these particularly severe acidic conditions.

Zeolites are also employed for drying or purifying other chemical species such as alcohols, mercaptans, etc., in which byproducts are not desired. However, experience proves that this may occur for the same reasons as those mentioned for COS, that is, the thermodynamic shift of a reversible reaction by the adsorption of water or $H_2S$ formed, combined with a potential catalytic effect of the zeolite. This could lead to the formation of species such as dialkyl ether or dialkyl sulfide by the following reactions:

$$2ROH \rightarrow ROR + H_2O$$

$$\text{or } 2RSH \rightarrow RSR + H_2S$$

SUMMARY OF THE INVENTION

The invention relates to zeolitic compositions which do not have the drawbacks mentioned above, that is, which do not promote side reactions, particularly those leading to the formation of COS, when contacted with gas mixtures containing $H_2S$ and $CO_2$.

The zeolitic compositions according to the invention comprise:

①  at least one zeolite which can be selected from A, X and/or Y zeolites (which are synthetic zeolites) and/or from zeolites of the chabazite type (which are natural zeolites), regardless of the associated cation or cations on one and/or the other of these zeolites, and ② at least one zeolite of the clinoptilolite type, and regardless of the associated cation or cations, which may be different or not from that or those of the zeolite or zeolites as defined in ①.

Preferably, the zeolite or zeolites as defined in ① accounts for at least 50% and, advantageously, between 70 and 90%, of the total zeolitic mass of the composition of the invention, the zeolite or zeolites as defined in ② accounting for up to 50% and, advantageously, between 10 and 30%, of the total zeolitic mass of said composition.

The zeolitic compositions according to the invention may be in powder form but, preferably, are in the form of beads, extrudates or yarn, and in general, in the form of agglomerates of average particle size distribution generally lower than or equal to several mm.

A further subject of the present invention is a method for obtaining the zeolitic compositions described above.

The zeolitic compositions of the invention in powder form can be prepared simply by intimate mixing of powders of zeolites ① and ②

The zeolitic compositions of the invention can be prepared in the form of agglomerates, by starting with a powdery intimate mixture of zeolites ① and ② which are agglomerated by means known to a person skilled in the art, for example, in the form of beads or extrudates, with or, preferably, without the use of an additional clay binder, the clinoptilolite acting as the binder.

In this case, only a very small amount of additional water is added to the mixture of powders of zeolites ① and ② to form a uniform paste, and optionally, one or more shaping additives, for example, carboxymethylcellulose or lignosulfonate. After this shaping, the zeolitic compositions are then dried, activated by conventional methods of a person skilled in the art.

The various zeolitic phases can be identified by their X-ray spectrum.

The average particle size distribution of these agglomerated zeolitic compositions is generally about 0.4 mm to 5 mm and advantageously between 1 and 3 mm.

The zeolitic compositions of the invention comprising at least chabazite and at least clinoptilolite have the additional advantage of withstanding the acidic conditions particularly well, more specifically in the presence of gases which are both hot (temperature about 200-300° C.) and/or humid (saturated with water) and/or acidic (containing high $H_2S$ and/or $CO_2$, contents typically of about several percent). Compared with a chabazite type of zeolite such as AW 500 agglomerated with a clay, they have about 10% greater water adsorption capacity.

The present invention further relates to the use of the zeolitic compositions described above for adsorbing water and, optionally, $H_2S$ and/or $CO_2$ present in gas or liquid mixtures, and particularly present in natural gas and in acid gases.

In order to remove both water and $H_2S$ from a low acid natural gas (<1% $H_2S$), while preventing the formation of COS, particular use can be made of a zeolitic composition according to the invention based on 5A zeolite and clinoptilolite and/or a zeolitic composition of the invention based on chabazite and clinoptilolite.

To simply remove water from a low acid natural gas (<1% $H_2S$), while preventing the formation of COS, use can be made of any zeolitic composition of the invention, and preferably, a composition according to the invention based on 3A zeolite and clinoptilolite.

In order to remove the water from a high acid natural gas (>1% $H_2S$), or a gas essentially composed of $H_2S$ and $CO_2$, while preventing the formation of COS, a composition of the invention based on 3A zeolite and clinoptilolite will be used, and preferably, a composition of the invention based on chabazite and clinoptilolite, for obtaining better resistance to acid gases.

The zeolitic compositions of the invention can also be employed for drying other chemical species such as alcohols, mercaptans, etc., for which byproducts are undesirable. For such applications, it is preferable to use compositions of the invention based on 3A zeolite and clinoptilolite.

WAYS OF IMPLEMENTING THE INVENTION

In examples 1 to 3 below, the invention is illustrated for the dehydration of an acid gas containing both $H_2S$ and $CO_2$. In example 4, the invention is illustrated for the dehydration of an alcohol.

Several zeolites and zeolitic compositions of different quality and from different sources are compared, their main properties being listed in Table 1. All these tested products were used in the form of yarn 1.6 mm in diameter; they were all used after an activation step at 550° C.

The properties of these zeolites were determined by conventional methods. The bulk densities were measured on untamped product. The water adsorption capacities, called H50, were measured by a static method in which the zeolite is placed in a closed chamber for 24 h in equilibrium with a controlled atmosphere with 50% relative humidity at ambient temperature. The water adsorption capacity was recorded by differential weighing.

Unless otherwise indicated, the proportions in the examples are weight proportions.

For reference, 2 commercial zeolites were used, that is, 3A zeolite sold by CECA under the trade name NK 30 consisting of 80% of 3A zeolite (KA, potassium exchange rate=42%) and clay binder, and chabazite-type zeolite sold under the trade name AW 500 by UOP.

TABLE 1

| | Name | | | | | | |
|---|---|---|---|---|---|---|---|
| | NK30 | AW 500 | CHA-i | CHA-a | CHA-b | CHA-c | CHA-d |
| type ① zeolitic structure | 80% 3A | chabazite k | 80% chabazite i | 80% chabazite i | 80% chabazite i | 80% chabazite i | 85% chabazite i |
| binder or type ② zeolitic structure | 20% clay | clay | 20% clay | 20% clinoptilolite a | 20% clinoptilolite b | 20% clinoptilolite c | 15% clinoptilolite d |
| bulk density (g/cm$^3$) | 0.8 | 0.68 | 0.64 | 0.55 | 0.53 | 0.54 | 0.50 |
| H50 (% weight) | 21.6 | 15 | 15 | 16.8 | 17.5 | 16.3 | 18.7 |
| Mechanical strength (kg) | 3 | 4.5 | 4.5 | 1.8 | 1.7 | 1.6 | 2.5 |

The various natural zeolites listed in the above table (chabazites and clinoptilolites) originate from different sources; their properties are listed in Table 2 below.

TABLE 2

| | H50 | Al$_2$O$_3$ (%) | CaO (%) | Fe$_2$O$_3$ (%) | K$_2$O (%) | MgO (%) | Na$_2$O (%) | SiO$_2$ (%) |
|---|---|---|---|---|---|---|---|---|
| AW500 | 15 | 17.21 | 5.55 | 4.24 | 1.30 | 1.35 | 3.08 | 66.74 |
| chabazite i | 19 | 18.08 | 0.73 | 3.80 | 1.27 | 0.92 | 9.48 | 65.42 |
| clinoptilolite a | 9.6 | 12.8 | 6.98 | 1.5 | 4.03 | 4.1 | 0.71 | 68 |
| clinoptilolite b | 10.5 | 12.4 | 3.32 | 0.75 | 3.91 | 0.68 | 1.26 | 76.9 |
| clinoptilolite c | 9.1 | 12.1 | 2.86 | 1.2 | 1.8 | 1.3 | 2.84 | 76.4 |
| clinoptilolite d | 10.2 | 14.68 | 3.39 | 1.59 | 4.58 | 1.27 | 0.74 | 73.16 |

EXAMPLE 1

COS Formation

This test serves to measure the formation of COS during the drying of a natural gas containing both H$_2$S and CO$_2$. The test is performed on a pilot unit which reproduces conditions very similar to industrial operation.

Composition of the gas to be treated:
Natural gas CH$_4$+10% of C$_2$+(ethane, propane, butane)
H$_2$S=2%
CO$_2$=4%
H$_2$O=1500 vpm
Column:
Adsorbent height=148 cm Adsorption conditions:
P=58 bar
T=43° C.
Flow rate such that linear speed v=0.11 m/s
Duration=up to an outlet water concentration of 70 vpm.
Desorption Conditions:
P=40 bar
T=up to 280° C.
Flow rate such that linear speed v=0.46 m/s, countercurrent to adsorption
Duration=1 h rise time; 3 h plateau; 6 h cooling.

During the adsorption step, the water content leaving the column is checked by a moisture analyzer of the Panametrics brand and the H$_2$S, CO$_2$ and COS contents are checked by an in-line chromatograph.

The water content is lower than 1 ppmv (detection limit of the instrument) up to the breakthrough which is followed up to a value of 70 ppmv. The COS contents may vary during the adsorption step, particularly because of the change in the water adsorption front in the column. Table 3 below shows the maximum COS values measured during these tests on the various products tested. These values were measured over several cycles, and in all cases at least after two adsorption cycles:

TABLE 3

| | Name | | | | | | |
|---|---|---|---|---|---|---|---|
| | NK30 | AW 500 | CHA-i | CHA-a | CHA-b | CHA-c | CHA-d |
| COS max (ppmv) | 300 | >450 | >450 | <70 | <70 | 80 | 150 |

NB: values > or < indicate an overrun of the specific COS calibration zone.

For information, the theoretical maximum COS concentration value obtained if thermodynamic equilibrium is reached without water adsorption (gas phase equilibrium) is calculated at 55 ppmv; this calculation is made using the thermodynamic equilibrium constant K=3.842×10$^{-6}$ at 43° C. according to the work of E. Terres et al., *Angewandte Chemie*, 1932, No. 52-53, p 795.

It may be observed that all the conventional adsorbents broadly exceed this latter value, which proves the equilibrium shift by water adsorption. A 3A sieve, even if it does not adsorb $H_2S$ and $O_2$, forms up to 300 ppmv of COS, a chabazite agglomerated with a clay binder forms more than 450 ppmv of COS. The same chabazite, but agglomerated with a clinoptilolite in a composition of the invention, forms much less COS: 150 ppmv (CHA-d) or less (CHA-a to CHA-c).

EXAMPLE 2

Water Adsorption Capacities

In addition to the H50 values in Table 1 which illustrate the performance of these zeolites and zeolitic compositions tested, and Table 2 showing that a clinoptilolite alone only has a H50 of 9-10, the water adsorption capacities are calculated, expressed as the weight of water adsorbed per unit volume of zeolite, calculated from the curves of peaking water up to the value of 10 ppmv. A mean is calculated on cycles 5 to 25. The results are given in Table 4 below in terms of comparative performance compared with NK30:

TABLE 4

| | Name | | | |
|---|---|---|---|---|
| | NK30 | AW500 | CHA-i | CHA-d |
| Relative Performance | 1 | 0.64 | 0.66 | 0.89 |

It is observed that the chabazites agglomerated with a clay only yield 64-66% of the performance of a 3A zeolite, whereas a composition of the invention (CHA-d) reaches 89% of the performance of 3A zeolite.

EXAMPLE 3

Resistance to Acid Gases

The samples of the various adsorbents are unloaded from the pilot column at the level of one of the following 3 zones: gas inlet (E), mid-column (M) and gas outlet (S). Each sample is then characterized according to its mechanical strength and its content of fines (<0.8 mm) formed. The mechanical strength results are expressed as a % of the value of the original product. They are listed in Table 5 below:

TABLE 5

| | Name | | | | | | | | |
|---|---|---|---|---|---|---|---|---|---|
| | NK30 | | | CHA-i | | | CHA-d | | |
| | Sample zone | | | | | | | | |
| | E | M | S | E | M | S | E | M | S |
| Fines content (weight %) | 4.5 | 0.4 | 0.1 | 1.3 | 0.2 | 0.1 | 2.5 | 0.4 | 0.3 |
| Change in mechanical strength (%) | 46 | 50 | 73 | 73 | 76 | 60 | 72 | 84 | 80 |

It is found that 3A zeolite deteriorates more rapidly mechanically; the pilot tests also had to be stopped due to an excessive increase in the pressure drop, preventing the continuation of the tests. It may be observed that the results are particularly dramatic in the gas inlet zone (E), which corresponds to the zone most saturated with wet (and acid) hot gas during the countercurrent thermal desorption step.

The CHA-d of the invention displays similar behavior to the CHA-i agglomerated with clay, that is, without faster deterioration of its mechanical strength. On these two products, the tests were continued after reloading in the pilot column without any problem of pressure drop increase.

EXAMPLE 4

Reaction with Ethanol

The reactivity of a commercial NK30 sieve described in Table 1 is compared with a zeolitic composition of the invention consisting of 80% 3A zeolite and 20% clinoptilolite a, of which the properties are listed in Table 2.

80 g of adsorbent are placed in a tube-in-shell reactor 63 cm in height and 1.5 cm in diameter. The reactor is heated under nitrogen at atmospheric pressure so that the temperature in the adsorbent bed reaches 130° C. A flow of 135 ml/h of liquid is sent, consisting of 96% ethanol and 4% water. This liquid evaporates in the column; the water is adsorbed on the solid, causing slight heating thereof by about 30° C. At the reactor outlet, a condenser cooled to −35° C. is placed to properly trap all the volatile compounds that may have formed in contact with the solid. Samples are taken per fraction and analyzed by gas chromatography coupled with mass spectrometry. The products detected are essentially acetaldehyde, diethyl ether and ethylene oxide.

The impurities contents (expressed in mg/l) obtained

* for the commercial NK30 sieve are listed in Table 6 below:

TABLE 6

| Sampling time (min) | Acetaldehyde | Ethylene oxide | Diethyl ether |
|---|---|---|---|
| 40 | 280 | 27 | 4 |
| 70 | 57 | 19 | 5 |
| 100 | 25 | 11 | 6 |
| 130 | 6 | <LD | 2 |
| 160 | 4 | <LD | 2 |
| 170 | 3 | <LD | =LD |

LD: detection limit.

* and in Table 7 below for the 3A sieve agglomerated with 20% clinoptilolite according to the invention:

TABLE 7

| Sampling Time (min) | Acetaldehyde | Ethylene oxide | Diethyl ether |
|---|---|---|---|
| 32 | 27 | <LD | 4 |
| 47 | 12 | <LD | =LD |
| 62 | 12 | <LD | <LD |
| 92 | 9 | <LD | <LD |

TABLE 7-continued

| Sampling Time (min) | Acetaldehyde | Ethylene oxide | Diethyl ether |
|---|---|---|---|
| 122 | 6 | <LD | <LD |
| 152 | 3 | <LD | <LD |

LD: detection limit.

The invention claimed is:

1. A zeolitic composition comprising a mixture of: (1) 70 and 90% by mass of total zeolite, at least one synthetic zeolite which is an A, X and/or Y zeolite and/or natural zeolites which is a chabazite type zeolites regardless of the associated cation or cations on one and/or the other of these zeolites, and (2) 10 and 30% by mass of total zeolite of at least one clinoptilolite type zeolite from a source separate from that of said chabazite type zeolite, regardless of the associated cation or cations, which may be different or not from that or those of the zeolite or zeolites as defined in (1).

2. The composition as claimed in claim 1, wherein the zeolite or zeolites as defined in (1) accounts for between 80 and 85% of the total zeolitic mass of the composition of the invention, the zeolite or zeolites as defined in (2) accounting for between 15 and 20% of the total zeolitic mass of said composition.

3. The composition as claimed in claim 1, as an intimate mixture of (1) and (2) in powder form.

4. The composition as claimed in claim 1, in the form of agglomerated objects, with an average particle size distribution of between about 0.4 mm and 5 mm.

5. A method for preparing a composition as claimed in claim 3, by intimate mixing of a powder of zeolite (1) with a separate powder of zeolite (2).

6. A method for preparing a composition as claimed in claim 3, by intimate mixing of powders of zeolites (1) and (2), followed by agglomeration with or without binder, and optionally in the presence of water and of one or more shaping additives, followed by drying and activation.

7. In a method for removing $H_2O$ and/or $CO_2$ and/or $H_2S$ present in gas or liquid mixtures, comprising subjecting said mixture to contact with a zeolite composition, the improvement wherein the zeolite composition is one of claim 1.

8. The method as claimed in claim 7, comprising drying and/or removing $H_2O$ and/or $CO_2$ and/or $H_2S$ present in natural gas and/or acid gases.

9. The method as claimed in claim 8, comprising removing water and $H_2S$ present in a low acid natural gas, with a zeolitic composition based on 5A zeolite ((1)) and clinoptilolite ((2)) and/or of a composition based on chabazite ((1)) and clinoptilolite ((2)).

10. The method as claimed in claim 8, comprising removing water present in a high acid natural gas or in a gas essentially composed of $H_2S$ and $CO_2$, with a composition based on 3A zeolite ((1)) and clinoptilolite ((2)).

11. The method as claimed in claim 7, comprising removing $H_2O$ and/or $CO_2$ and/or $H_2S$ present in alcohols and/or mercaptans.

12. A composition according to claim 1, wherein the zeolite defined in (1) consists essentially of zeolite 3A and the zeolite defined in (2) consists essentially of clinoptilolite.

13. A composition according to claim 12, wherein the zeolite defined in (1) consists essentially of zeolite 3A and the zeolite defined in (2) consists essentially of clinoptilolite.

14. A zeolite composition according to claim 2, wherein the zeolite defined in (1) consists essentially of chabazite and the zeolite defined by (2) consists essentially of clinoptilolite.

15. A composition according to claim 2, without a binder in the form of an agglomerate having an average particle size distribution of between about 1 and 3 mn.

16. A composition prepared according to the method of claim 6.

17. In a method for removing $H_2O$ and/or $CO_2$ and/or $H_2S$ present in gas or liquid mixtures, comprising subjecting said mixture to contact with a zeolite composition, the improvement wherein the zeolite composition according to claim 13.

18. A method as claimed in claim 17, comprising removing water present in a high acid natural gas or in a gas essentially composed of $H_2S$ and $CO_2$, with a composition based on 3A zeolite ((1)) and clinoptilolite ((2)).

19. In a method for removing sufficient amounts of H2S and CO2 so as to lower the concentration of COS wherein a gaseous stream is contacted with an adsorption agent, the improvement wherein the adsorption agent comprises a zeolitic composition according to claim 14.

20. In a method of removing $H_2O$ from a gas wherein a gaseous stream is contacted with an adsorption agent, the improvement wherein the adsorption agent comprises a zeolitic agent according to claim 14.

21. A zeolitic composition consisting essentially of a mixture of: (1) 70 and 90% by mass of total zeolite, at least one synthetic zeolite which is an A, X and/or Y zeolite and/or natural zeolites which is a chabazite type zeolites regardless of the associated cation or cations on one and/or the other of these zeolites, and (2) 10 and 30% by mass of total zeolite of at least one clinoptilolite type zeolite from a source separate from that of said chabazite type zeolite, regardless of the associated cation or cations, which may be different or not from that or those of the zeolite or zeolites as defined in (1).

22. A zeolitic composition consisting of a mixture of: (1) 70 and 90% by mass of total zeolite, at least one synthetic zeolite which is an A, X and/or Y zeolite and/or natural zeolites which is a chabazite type zeolites regardless of the associated cation or cations on one and/or the other of these zeolites, and (2) 10 and 30% by mass of total zeolite of at least one clinoptilolite type zeolite from a source separate from that of said chabazite type zeolite, regardless of the associated cation or cations, which may be different or not from that or those of the zeolite or zeolites as defined in (1).

* * * * *